Patented June 20, 1939

2,162,970

UNITED STATES PATENT OFFICE 2,162,970

CYCLIC SUBSTITUTED DICHLORINATED ALIPHATIC HYDROCARBONS AND PROCESSES OF PREPARING THE SAME

Anderson W. Ralston and Carl W. Christensen, Chicago, Ill., assignors to Armour and Company, Chicago, Ill., a corporation of Illinois No Drawing. Application November 12, 1937, Serial No. 174,266

6 Claims. (Cl. 260—612)

This invention relates to cyclic substituted, dichlorinated, aliphatic hydrocarbons and processes of preparing the same, and it comprises, as new products, compounds having the generic formula

wherein R is a cyclic radical and R' is an alkyl radical having at least eleven carbon atoms, and it further comprises processes wherein ketones having the formula RCOR', wherein R is a cyclic radical and R' is an alkyl radical having at least eleven carbon atoms are reacted with phosphorous pentachloride.

In certain of our prior patents we have described and claimed new mixed ketones of high molecular weight. In our U. S. Patent 2,033,540 we have described phenoxyphenyl alkyl ketones; diphenyl alkyl ketones are described in our Patent Number 2,033,541; furyl and dibenzofuryl ketones in Patents 2,033,542 and 2,033,548, and mixed xylyl heptadecyl ketones in our Patent Number 2,075,765. These ketones are useful for many purposes, especially in wax compositions, dielectrics, and lubricants.

We have now discovered that high molecular weight mixed ketones will react with phosphorous pentachloride to give high molecular weight chlorine-containing compounds resulting from the substitution of the carbonyl oxygen in the ketones by chlorine. The general equation can be written as follows:

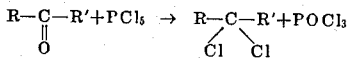

This reaction goes smoothly at moderately elevated temperatures and the resulting products are either solids or high boiling liquids.

We have discovered that the reaction is a general one for all mixed ketones having the structural formula RCOR' wherein R is a cyclic radical and R' is an alkyl radical containing at least eleven carbon atoms.

Thus, in accordance with our invention, we can react any ketone falling within our generic definition given above with phosphorous pentachloride. The reaction products can be generically defined as cyclic substituted, dichlorinated, aliphatic hydrocarbons having the general formula

wherein R is a cyclic radical and R' is an alkyl radical containing eleven or more carbon atoms.

The ketone starting material for the preparation of our chlorine-containing compounds can, for example, be one in which the cyclic radical is phenyl, tolyl, xylyl, phenoxyphenyl, chlorphenyl, methoxyphenyl, naphthyl, anthracyl, diphenyl, chlorinated diphenyl, furyl, dibenzofuryl, thienyl and carbazole.

The alkyl radical can be any alkyl radical having at least eleven carbon atoms; such radicals are, for example, undecyl, tridecyl, pentadecyl and heptadecyl.

Many of the ketones which we use as starting materials are new with us since they were first described in the aforesaid patents. In addition, thienyl alkyl ketones are the subject matter of the Ralston application, Serial No. 104,704 and carbazole-alkyl ketones are the subject matter of the Ralston and Christensen application, Serial No. 101,675.

The following list gives many ketones which we can use as starting materials in the preparation of our chlorine-containing compounds.

Phenyl heptadecyl ketone, p-tolyl heptadecyl ketone, m-xylyl heptadecyl ketone, p-xylyl heptadecyl ketone, m-xylyl pentadecyl ketone, p-tolyl pentadecyl ketone, p-methoxyphenyl pentadecyl ketone, p-ethoxyphenyl pentadecyl ketone, phenyl undecyl ketone, p-chlorphenyl undecyl ketone, p-methoxyphenyl heptadecyl ketone, p-methoxyphenyl undecyl ketone, p-phenoxyphenyl heptadecyl ketone, p-phenoxyphenyl tridecyl ketone, p-phenoxyphenyl undecyl ketone, p-nitro phenoxyphenyl heptadecyl ketone, p-methyl phenoxyphenyl heptadecyl ketone, alpha naphthyl heptadecyl ketone, alpha naphthyl pentadecyl ketone, anthracyl heptadecyl ketone, diphenyl heptadecyl ketone, diphenyl tridecyl ketone, diphenyl undecyl ketone, p-methyl biphenyl heptadecyl ketone, p-chlor biphenyl heptadecyl ketone, furyl heptadecyl ketone, methyl furyl heptadecyl ketone, dibenzofuryl heptadecyl ketone, and dibenzofuryl undecyl ketone.

We shall now give examples of reacting some of these ketones with phosphorous pentachloride, it being understood that these examples are merely illustrative.

Example 1

Five parts of diphenyl heptadecyl ketone, M. P. 104–106° C., are placed in a flask connected with a stirrer and reflux condenser. Ten parts of phosphorous pentachloride are then added and the mixture heated in an oil bath for three hours at 120° C. After cooling, the reaction mixture is freed from unreacted phosphorous pentachloride and phosphorous oxychloride by heating under a vacuum. The crude reaction product is a waxy solid, M. P. 70-73° C. After two recrystallizations from benzene the product melts at 77-79° C. It is 1-diphenyl-1,1-dichloroctadecane.

*Example 2*

Five parts of phenoxyphenyl heptadecyl ketone and ten parts of phosphorous pentachloride are placed in a reaction flask equipped with a mechanical stirrer and reflux condenser. The mixture is heated over an oil bath for three hours at 120° C. The product is then treated as previously described under Example 1. The crude reaction product has a melting point of 4.4°-6.7° C. After several recrystallizations from a 50% alcohol-benzene mixture the final product is a wax-like solid, M. P. 57.0°-59.5° C. It is 1-phenoxyphenyl-1,1-dichloroctadecane.

*Example 3*

Fifteen parts of xylyl undecyl ketones are reacted with thirty parts of phosphorous pentachloride as described under Example 1. The product is a light colored liquid and consists of a mixture of 1-xylyl-1,1-dichlorododecanes. The reaction product has a freezing point of —8.9° C. and most probably comprises a mixture of compounds in which the xylyl radical is in part ortho xylyl, in part meta xylyl and in part para xylyl.

In general the reaction mixture should be heated to a temperature of between about 100° C. and 150° C. although the heating temperature may, of course, vary with the reactivity of the ketone. The amount of phosphorous pentachloride used should, of course, be at least molecularly equivalent to the amount of ketone but we generally use an excess of the chlorinating agent to insure completion of the reaction.

In the same manner phenyl heptadecyl ketone yields, on treatment with phosphorous pentachloride, 1-phenyl-1,1-dichloroctadecane and alpha naphthyl pentadecyl ketone yields 1 alpha naphthyl-1,1-dichlorohexadecane.

All of the chlorine-containing compounds of our invention are useful as addition agents to lubricating oils for the purpose of increasing oiliness thereof, some of them, such as the xylyl dichloro hydrocarbons, are useful as lubricants per se because of their fluidity and low freezing point, those cyclic substituted dichlorinated hydrocarbons of our invention which are waxy solids can be used in polishing compositions, and they are also suitable as dielectric materials.

Having thus described our invention, what we claim is:

1. A cyclic substituted dichlorinated hydrocarbon having the formula

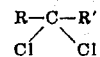

wherein R is an aryl radical and R' is an alkyl radical having at least eleven carbon atoms.

2. The compound as in claim 1 wherein R is an aryl radical.

3. The compound as in claim 1 wherein R' is a heptadecyl radical.

4. As a new material 1-diphenyl-1,1-dichloroctadecane.

5. As a new material 1-phenoxyphenyl-1,1-dichloroctadecane.

6. As a new material 1-xylyl-1,1-dichlorododecane.

ANDERSON W. RALSTON.
CARL W. CHRISTENSEN.